(12) United States Patent
Kwak et al.

(10) Patent No.: US 10,728,355 B2
(45) Date of Patent: Jul. 28, 2020

(54) DISTRIBUTED FORWARDING SYSTEM AND METHOD FOR SERVICE STREAM

(71) Applicant: ELECTRONICS AND TELECOMMUNICATIONS RESEARCH INSTITUTE, Daejeon (KR)

(72) Inventors: Ji Young Kwak, Gwangju (KR); Chung Lae Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 52 days.

(21) Appl. No.: 16/043,393

(22) Filed: Jul. 24, 2018

(65) Prior Publication Data

US 2019/0037042 A1 Jan. 31, 2019

(30) Foreign Application Priority Data

Jul. 26, 2017 (KR) .................. 10-2017-0094819

(51) Int. Cl.
*G06F 15/16* (2006.01)
*H04L 29/08* (2006.01)
*H04L 12/26* (2006.01)
*H04L 12/723* (2013.01)
*H04L 12/911* (2013.01)
*H04L 12/717* (2013.01)
(Continued)

(52) U.S. Cl.
CPC .......... *H04L 67/2842* (2013.01); *H04L 43/16* (2013.01); *H04L 45/04* (2013.01); *H04L 45/42* (2013.01); *H04L 45/50* (2013.01); *H04L 45/70* (2013.01); *H04L 47/822* (2013.01)

(58) Field of Classification Search
CPC ..... H04L 67/2842; H04L 43/16; H04L 45/04; H04L 45/42; H04L 45/50; H04L 45/70; H04L 47/822
See application file for complete search history.

(56) References Cited

U.S. PATENT DOCUMENTS 9,253,087 B2 2/2016 Zhang et al.
9,369,541 B2 6/2016 Medard et al.
9,756,535 B2 9/2017 Lee et al.
(Continued)

FOREIGN PATENT DOCUMENTS

KR 10-2013-0138670 A 12/2013
KR 10-2014-0125223 A 10/2014
(Continued)

*Primary Examiner* — Sm A Rahman
(74) *Attorney, Agent, or Firm* — LRK Patent Law Firm (57) ABSTRACT

A service stream control system includes at least one area controller configured to control a traffic path and content cashing within a domain (intra-area), a service content coordinator configured to determine and manage a caching location of content located in the domain, and a service stream controller configured to set an optimum path in accordance with a network traffic state by interworking with the at least one area controller and the service content coordinator, and forward target content corresponding to a content request with reference to a service stream forwarding graph generated based on the set path. Therefore, it is possible to enhance efficiency of a content-centric network (CCN).

17 Claims, 10 Drawing Sheets

(51) Int. Cl.
*H04L 12/721* (2013.01)
*H04L 12/715* (2013.01)

(56) References Cited

U.S. PATENT DOCUMENTS

| | | | |
|---|---|---|---|
| 2013/0125167 A1* | 5/2013 | Sharif-Ahmadi | ............................ H04N 21/4667 725/37 |
| 2014/0173018 A1 | 6/2014 | Westphal et al. | |
| 2014/0317272 A1 | 10/2014 | Kim et al. | |
| 2015/0215405 A1 | 7/2015 | Baek et al. | |
| 2015/0227534 A1 | 8/2015 | Jeon et al. | |
| 2016/0057061 A1* | 2/2016 | Avci | ..................... H04L 47/125 370/235 |
| 2017/0237657 A1* | 8/2017 | Rath | ..................... H04L 45/306 709/238 |

FOREIGN PATENT DOCUMENTS

| | | | |
|---|---|---|---|
| KR | 10-1533511 | B1 | 7/2015 |
| KR | 10-1688857 | B1 | 12/2016 |
| KR | 10-1699679 | B1 | 1/2017 |

\* cited by examiner

DISTRIBUTED FORWARDING SYSTEM AND METHOD FOR SERVICE STREAM

CROSS REFERENCE TO RELATED APPLICATION

This application claims priority to Korean Patent Application No. 10-2017-0094819, filed Jul. 26, 2017 in the Korean Intellectual Property Office (KIPO), the entire content of which is hereby incorporated by reference.

BACKGROUND

1. Technical Field

Example embodiments of the present invention relate in general to a distributed forwarding method of a service stream, and more specifically, to a method and apparatus for adaptively controlling a service stream in accordance with a traffic state.

2. Description of Related Art

With increasing users of a current Internet service, a data use amount has also been largely on the rise.

In particular, most of the Internet services use the same data since millions of users make requests for the same service such as a webpage. On the other hand, a current Internet transmission method of transmitting data is based on Internet protocol (IP) addresses of transmission/reception hosts regardless of data, and thus a problem arises in that the same data is repetitively transmitted through a network as many times as the number of users who make requests for the data.

As an alternative to such wasteful data transmission, there has been researched content (or information) centric technology in which data is transmitted using a data name instead of the existing IP address.

For example, a content centric research includes content-centric network (CCN), data-oriented network architecture (DONA), publish subscribe Internet routing paradigm (PSIRP), and networking of information (NetInf).

Here, the CCN may have a problem of traffic congestion because a data request packet, i.e., interest packet, of a content consumer is broadcasted to all neighboring routers.

Further, the transmission may be delayed because each router has to refer to a pending interest table (PIT) and a forwarding information base (FIB) to transmit a packet.

Therefore, it is difficult to apply the existing researches on the CCN to a large-scale network, and thus there is a need of reducing network traffic congestion and increasing efficiency.

SUMMARY

Accordingly, example embodiments of the present invention are provided to substantially obviate one or more problems due to limitations and disadvantages of the related art.

Example embodiments of the present invention provide a content-centric network (CCN)-based service stream control system.

Example embodiments of the present invention also provide a CCN-based service stream control method in a service stream controller.

Example embodiments of the present invention also provide a CCN-based service stream control apparatus.

In some example embodiments, there is provided a service stream control system.

Here, the service stream control system may include at least one area controller configured to control a traffic path and content cashing within a domain (intra-area); a service content coordinator configured to determine and manage a caching location of content located in the domain; and a service stream controller configured to set an optimum path in accordance with a network traffic state by interworking with the area controller and the service content coordinator, and forward target content corresponding to a content request with reference to a service stream forwarding graph generated based on the set path.

Here, when the service stream controller receives a content request from a service requesting node located within a first domain and controlled by a first area controller, the service stream controller may check a location in which the target content is cached, by interworking with the service content coordinator or the at least one area controller, set a path in accordance with a network traffic state, based on whether the checked target content is cached in the first domain, and assign an adaptive service content forwarder for forwarding the target content to every content request with reference to the service stream forwarding graph generated based on the set path.

Here, the adaptive service content forwarder may forward the target content by adaptively controlling quality of the target content in accordance with a network traffic state and a service corresponding to the content request.

Here, the service stream forwarding graph may include information used in transmitting the content request to a node, in which the target content is cached, based on multi-protocol label switching (MPLS).

Here, the target content may be cached in a multi-layered structure including a base layer and an enhanced layer.

Here, the adaptive service content forwarder may forward only the base layer of the target content or forward the enhanced layer of the target content together with the base layer, by taking the network traffic state into account.

Here, the adaptive service content forwarder may forward only the base layer of the target content or forward the enhanced layer of the target content together with the base layer, in accordance with a type of service (TOS) checked in the content request.

Here, the adaptive service content forwarder may forward the target content along an intra-cache path set between nodes within the first domain by interworking with the first area controller when the target content is cached in the first domain, and forward the target content by setting an inter-cache path through a gateway node connected to a domain in which the target content is cached when the target content is not cached in the first domain.

Here, the service stream controller may control the target content to be additionally cached in a first node that belongs to a domain adjacent to the first domain when the number of times to forward the target content is equal to or higher than a threshold value.

Here, the service stream controller may control the target content to be additionally cached in a second node within the first domain when the number of times to forward the target content from the first node is equal to or higher than a threshold value.

Here, the service stream controller may control the base layer of the target content or both the base layer and the enhanced layer of the target content to be partially cached in different nodes located within the first domain when a request for the target content additionally cached in the second node is made equal to or more than a preset value.

In other example embodiments, there is provided a service stream control method of a service stream controller interworking with at least one area controller and a service content coordinator.

Here, the service stream control method may include receiving a content request from a service requesting node located within a first domain and controlled by a first area controller; checking a location in which target content corresponding to the content request is cached, by interworking with the service content coordinator or the at least one area controller; setting a path in accordance with a network traffic state, based on whether the checked target content is cached in the first domain; and assigning an adaptive service content forwarder for forwarding the target content to every content request with reference to a service stream forwarding graph generated based on the set path.

Here, the adaptive service content forwarder may forward the target content by adaptively controlling quality of the target content in accordance with a network traffic state and a service corresponding to the content request.

Here, the service stream forwarding graph may include information used in transmitting the content request to a node, in which the target content is cached, based on multi-protocol label switching (MPLS).

Here, the target content may be cached in a multi-layered structure including a base layer and an enhanced layer.

Here, the adaptive service content forwarder may forward the target content along an intra-cache path set between nodes within the first domain by interworking with the first area controller when the target content is cached in the first domain, and forward the target content by setting an inter-cache path through a gateway node connected to a domain in which the target content is cached when the target content is not cached in the first domain.

Here, the service stream control method may further include controlling the target content to be additionally cached in a first node that belongs to a domain adjacent to the first domain when the number of times to forward the target content is equal to or higher than a threshold value.

Here, the service stream control method may further include controlling the target content to be additionally cached in a second node within the first domain when the number of times to forward the target content from the first node is equal to or higher than a threshold value.

Here, the service stream control method may further include controlling the base layer of the target content or both the base layer and the enhanced layer of the target content to be partially cached in different nodes located within the first domain when a request for the target content additionally cached in the second node is made equal to or more than a preset value.

In still other example embodiments, there is provided a service stream control apparatus including a processor configured to execute at least one command; and a memory configured to store the at least one command.

Here, the processor may receive a content request from a service requesting node located within a first domain and controlled by a first area controller; check a location in which target content corresponding to the content request is cached, by interworking with a service content coordinator or at least one area controller; set a path in accordance with a network traffic state, based on whether the checked target content is cached in the first domain; and assign an adaptive service content forwarder for forwarding the target content to every content request with reference to a service stream forwarding graph generated based on the set path.

BRIEF DESCRIPTION OF DRAWINGS

Example embodiments of the present invention will become more apparent by describing example embodiments of the present invention in detail with reference to the accompanying drawings, in which.

DETAILED DESCRIPTION OF EXAMPLE EMBODIMENTS

Example embodiments of the present invention are disclosed herein. However, specific structural and functional details disclosed herein are merely representative for purposes of describing the example embodiments of the present invention, however, the example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion "between" versus "directly between," "adjacent" versus "directly adjacent," etc.).

The terminology used herein is for the purpose of describing particular embodiments only and is not intended to be limiting of the invention. As used herein, the singular forms ""a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
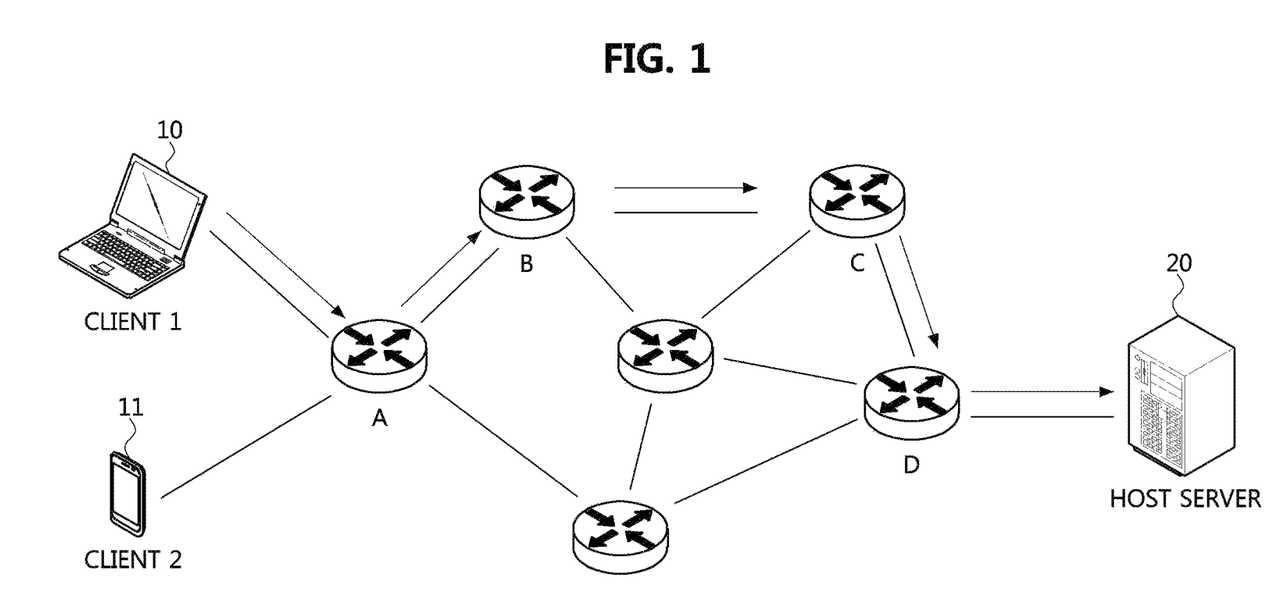
FIG. 1 is a first conceptual diagram for describing a general content-centric network (CCN)-based content forwarding method according to one embodiment of the present invention.
Figure 2:
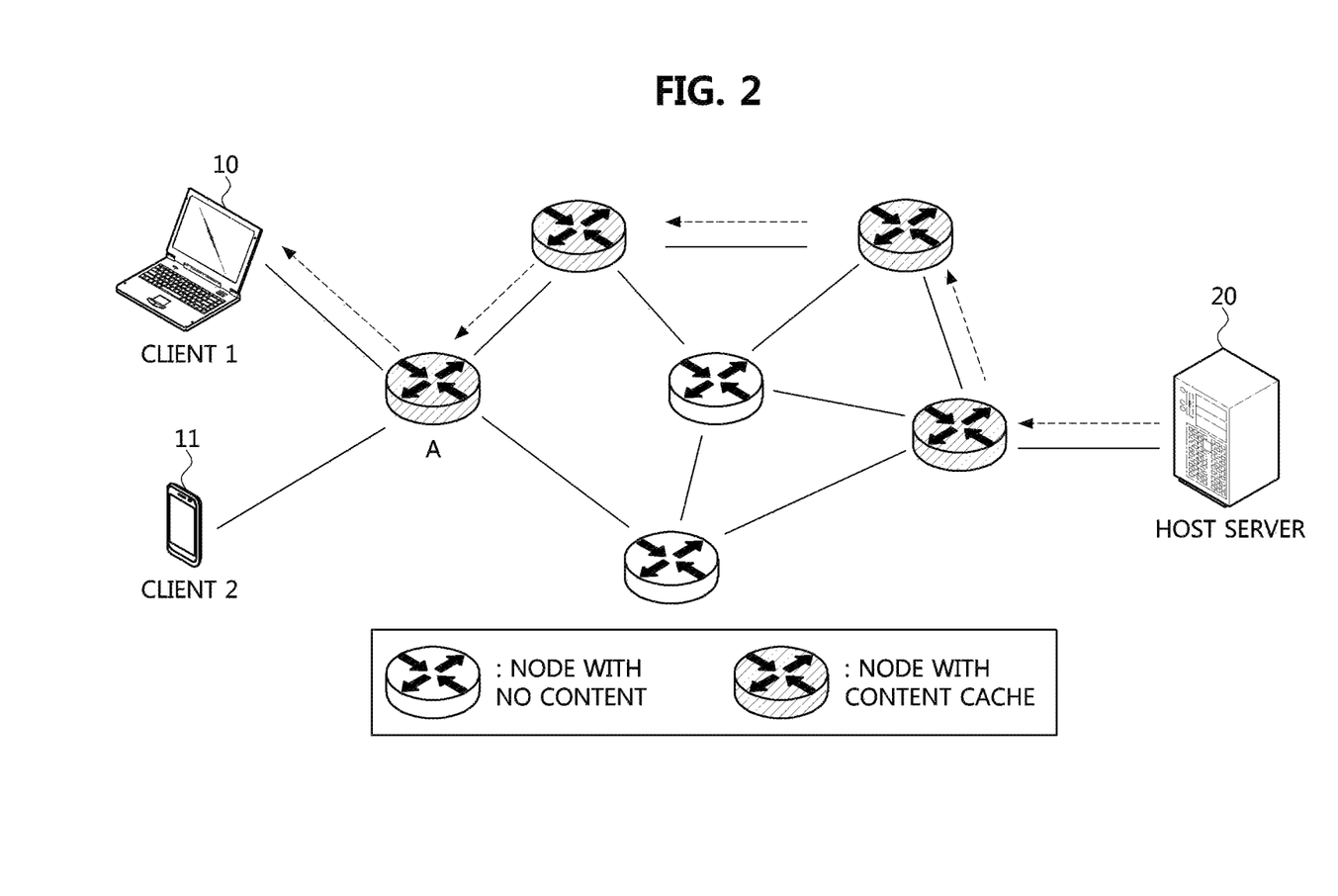
FIG. 2 is a second conceptual diagram for describing a general CCN-based content forwarding method according to one embodiment of the present invention.
Figure 3:
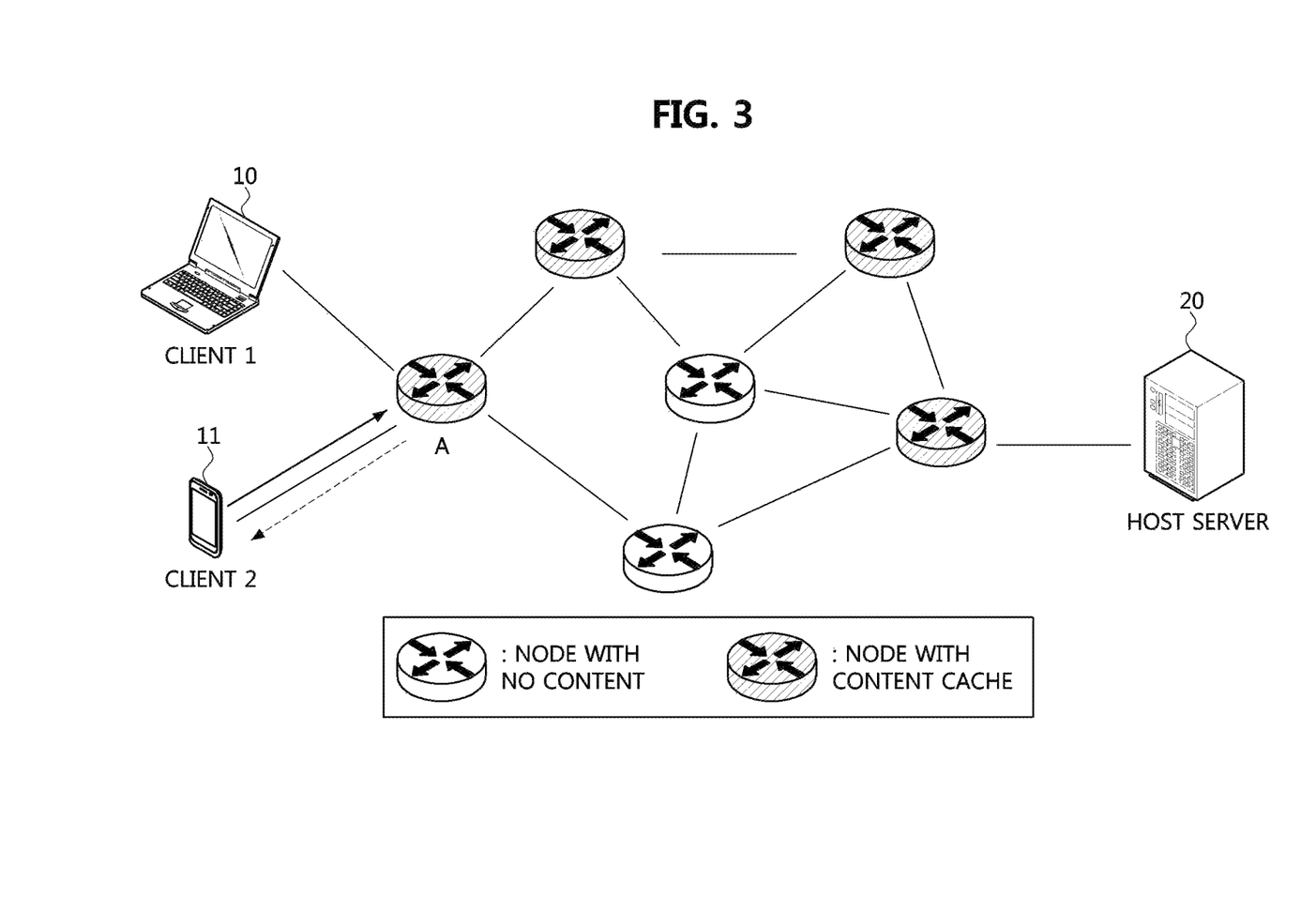
FIG. 3 is a third conceptual diagram for describing a general CCN-based content forwarding method according to one embodiment of the present invention.

FIG. 1 is a first conceptual diagram for describing a general content-centric network (CCN)-based content forwarding method according to one embodiment of the present invention, FIG. 2 is a second conceptual diagram for describing a general CCN-based content forwarding method according to one embodiment of the present invention, and FIG. 3 is a third conceptual diagram for describing a general CCN-based content forwarding method according to one embodiment of the present invention.

Referring to FIG. 1, a first client 10 may transmit a packet (or an interest packet) for requesting content to a host server 20 through a CCN-based network environment.

For example, when target content is stored in the host server 20, the content requesting packet may be transmitted from a CCN node A to the host server 20 via a CCN node B, a CCN node C, and a CCN node D.

Here, the first client 10 may broadcast the content requesting packet including a content name, and the CCN nodes A to D may receive and store the content requesting packet.

Further, the host server 20 storing the target content may transmit the content in response to the CCN node or the client of transmitting the content requesting packet.

Specifically, referring to FIG. 2, the host server 20 receiving the content requesting packet may transmit stored content (or a data packet) along a path through which the content requesting packet has been transmitted. During this process, the CCN nodes A to D provided on the path of transmitting the content may store the content and then forward the content to the next node.

Next, referring to FIG. 3, when a second client 11 requests the same content as that of the first client 10, the second client 11 may transmit a target-content requesting packet to the CCN node A, and directly receive target content from the CCN node A.

Like this, since the target content is stored in the CCN node A while the target content is transmitted to the first client 10, it is advantageous for the second client 11 to receive the target content from a closer node more quickly and with less traffic load than the first client 10.

Meanwhile, the CCN node shown in FIGS. 1 to 3 may be configured to include a content store (CS), a pending interest table (PIT), and a forwarding information base (FIB).

Here, the CS may store and manage content and a content list, and the PIT may store and manage the interest packet being received and transmitted from and to which face. Further, the FIB stores a prefix of the content name, and stores a list of faces to be referred when the interest packet is transmitted.

Specifically, the CCN node may perform a longest match lookup in order of the CS, the PIT, and the FIB when receiving the content requesting packet (e.g. the interest packet). When content checked in the interest packet matches the content in the CS, it is determined that the requested content has been stored, thereby forwarding the matching content to a face to which the interest packet is input, and then deleting the interest packet. Next, when the content name of the interest packet is found in the PIT, it is determined that another client transmits the interest packet with regard to the same content, thereby adding a face which received the interest packet to the PIT.

Further, when the content name of the interest packet is found in the FIB, a face for forwarding the interest packet is determined on the basis of information registered to the FIB, and information about the face which received the interest packet is stored in the PIT.

Meanwhile, the CCN node may perform the longest match lookup in order of the CS, the PIT and the FIB when receiving a data packet (i.e., a packet including content). When the content name of the data packet is found in the CS, the data packet may be deleted because the data is already present.

Next, when the content name of the data packet is found in the PIT, it is determined that the requested data has arrived, thereby storing the corresponding content and forwarding the data packet to the face which received the corresponding interest packet.

Further, when the content name of the data packet is found in the FIB, it is determined that the received data is not requested because it is not found in the PIT, thereby deleting the data packet.

Figure 4:
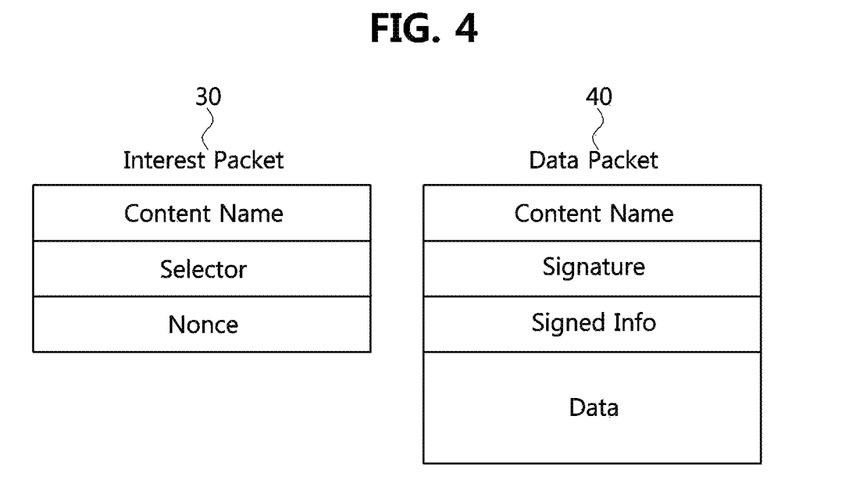
FIG. 4 shows diagrams of examples of packets applied to the general CCN-based content forwarding method according to one embodiment of the present invention.

FIG. 4 shows diagrams of examples of packets applied to the general CCN-based content forwarding method according to one embodiment of the present invention.

Referring to FIG. 4, in a general CCN-based network environment, structures of content requesting packets, i.e., an interest packet 30 and a data packet 40 including requested content, will be described as follows.

First, the interest packet 30 may include a content name, a selector, and a nonce.

Here, the content name may refer to an identification sign for indicating a name of requested content, and the selector may refer to a sign for describing details of the undescribed name of the content name, providing information about a preferred CS, indicating information provided for the purpose of management of security, or the like. Further, the nonce refers to an irregularly generated byte string for preventing a loop from being formed while the interest packet 30 is identified and broadcasted.

The data packet 40 may include a content name, a signature, sign information, and data. Here, the content name may be an identification sign for indicating a name of data included in the packet, and the sign information may include a time stamp, the kind of data, an effective life of the data, a location of an encryption key when the data is encrypted, etc.

Meanwhile, under the CCN-based network environment shown in FIG. 1 to FIG. 4, the interest packet 30 is broadcasted to a neighboring node and thus causes problems of traffic congestion and the like. In addition, each node is based on the PIT or FIB when transmitting the interest packet or the data packet, and thus causes a transmission delay.

Further, since data is cached in all the nodes on the path via which the data packet is transmitted, wasteful caching operations are performed and thus a load applied to each node increases.

Therefore, when the interest packet for requesting content is not broadcasted in the CCN-based network environment but transmitted through an optimum path which is set based on a multiplexed structure of a controller, the problems of traffic congestion and the like will be solved and it will be applicable to a large-scale network.

Further, when popular content is gradually cached in a node on a path, via which a packet is transmitted, instead of caching data in all the nodes, and the content is stored in a multi-layered structure, it will be possible to enhance efficiency by taking a traffic state into account.

Below, a system and method for improving the CCN-based network environment shown in FIG. 1 to FIG. 4 and having the foregoing effects will be described.

Figure 5:
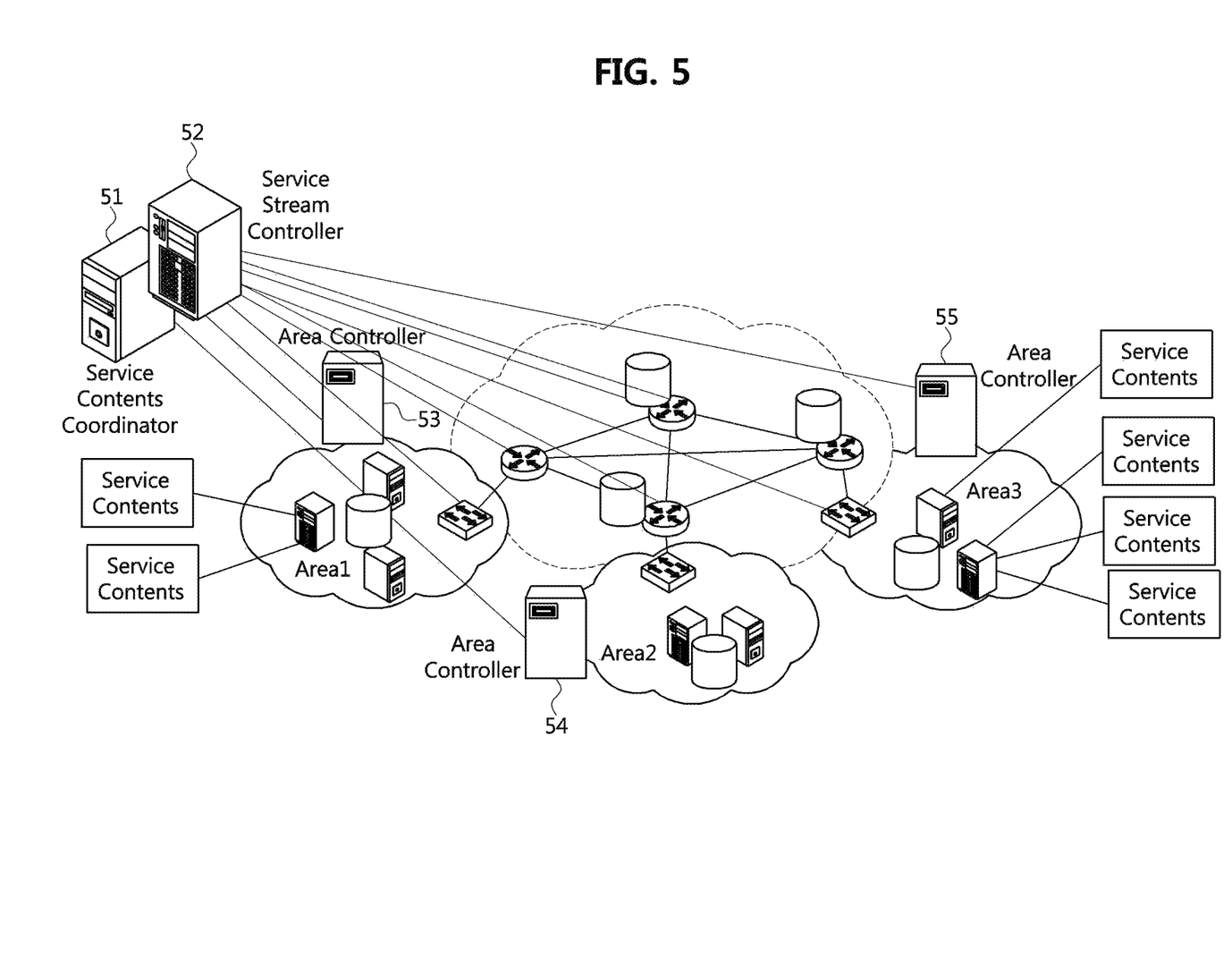
FIG. 5 is a conceptual diagram of a service stream control system according to one embodiment of the present invention.
Figure 6:
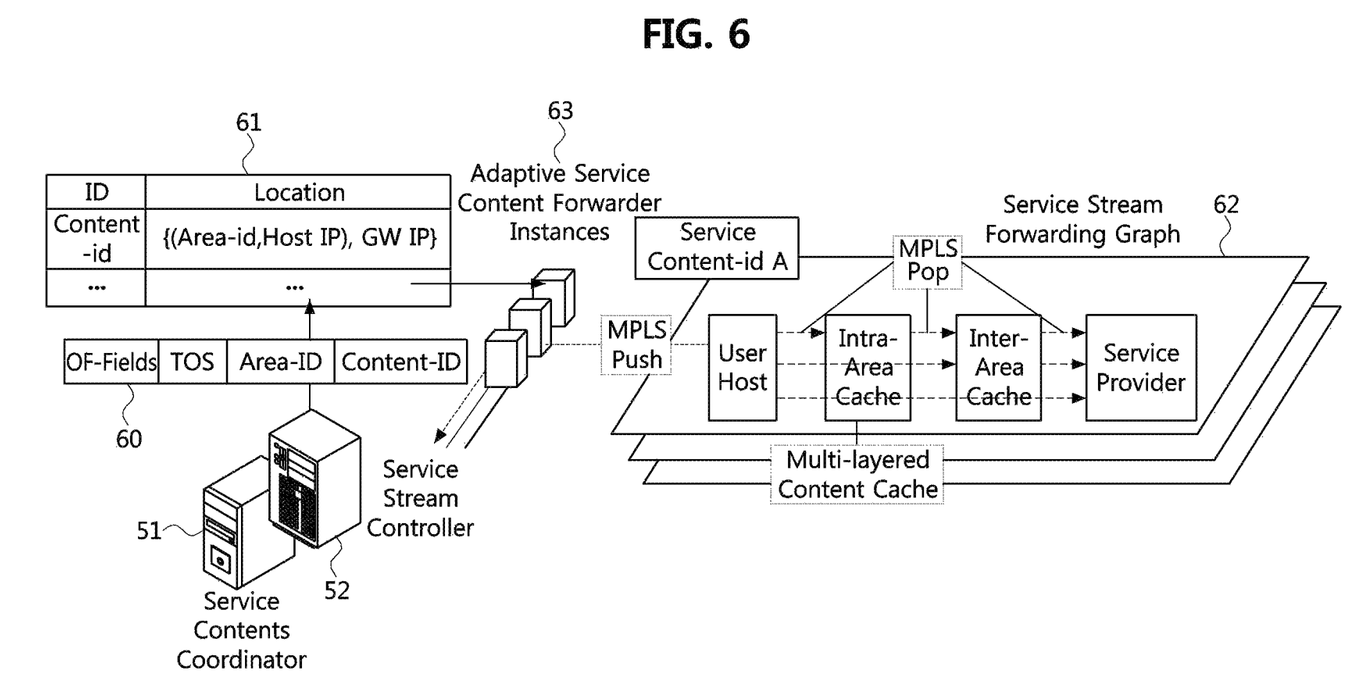
FIG. 6 is a first diagram for describing an example of a content forwarding process in the service stream control system.

FIG. 5 is a conceptual diagram of a service stream control system according to one embodiment of the present invention. FIG. 6 is a first diagram for describing an example of a content forwarding process in the service stream control system.

Referring to FIGS. 5 and 6, the service stream control system may include one or more area controllers 53 to 55 for controlling a traffic path and content caching within a domain (of an intra-area); a service content coordinator 51 for determining and managing a cache location of content in the domain; and a service stream controller 52 for setting an optimum path in accordance with a network traffic state while interworking with the area controller 54 and the service content coordinator 51, and forwarding target content in response to a content request with reference to a service stream forwarding graph 62 generated based on the set path.

When the service stream controller 52 receives a content request from a service requesting node located within a first domain (Area1) under control of the first area controller 53, the service stream controller 52 may check a location, in which the target content is cached, by interworking with the service content coordinator 51 or the one or more area controllers 53 to 55; set a path in accordance with the network traffic state, on the basis of whether the checked target content is cached in the first domain; and assign an adaptive service content forwarder 63, which forwards the target content with reference to the service stream forwarding graph 62 generated on the basis of the set path, to each content request.

Here, the service requesting node may refer to various user terminals as a client for requesting content (i.e., a service requester). For example, the user terminal may include a desktop computer, a laptop computer, a notebook computer, a smart phone, a tablet personal computer (PC), a mobile phone, a smart watch, a smart glass, an e-book reader, a portable multimedia player (PMP), a handheld game console, a global positioning system (GPS), a digital camera, a digital multimedia broadcasting (DMB) player, a digital audio recorder, a digital audio player, a digital video recorder, a digital video player, a personal digital assistant (PDA), and the like capable of performing communication.

Here, a network to be controlled by the service stream control system may refer to the network shown in FIGS. 1 to 3. Each node on the network may include a router or a switch, and may include a user terminal for requesting content and a host server primitively storing and providing the content.

Further, the router or switch of the network to be controlled by the service stream control system may receive control information from each of the area controllers 53 to 55, cache content therein, collect information about which content being retained and which packet being received and transmitted, and provide the collected information to the area controllers 53 to 55.

Here, the content request is transmitted as the interest packet shown in FIGS. 1 to 4, but not limited thereto. Alternatively, the content request may be transmitted as an Internet protocol (IP)-based packet including an identification sign of requested content. Further, the content request may be received through the first area controller 53.

Here, the service stream controller 52 may collect information each node on the network has from the area controller, generate a network topology with distributed content and distributed nodes on the basis of the collected information, and set an optimum content forwarding path based on the network topology.

Here, the service content coordinator 51 may store and manage information (Host IP) about a host that provides content, information (Area-ID) of a domain where the content is located, and information (GW IP) about a gateway of the domain where the content is provided, and may also manage location information of cached content when content is additionally cached in a node (i.e., a router, a switch, etc.) of the network.

Referring to FIG. 6, details are as follows. When the service stream controller 52 receives a content request 60, the service stream controller 52 may check a type of service (TOS), an identification sign (Area ID) of a domain where a request for service is made, an identification sign (content-ID) of requested content, etc. from the received content request 60.

Therefore, the service stream controller 52 may check a location where the content is stored, on the basis of information 61 to be managed by the service content coordinator 51. In this case, when content is additionally cached in nodes on the network, such as a router, a switch, and the like, the location of the cashed content may be checked by the service content coordinator 51 or the one or more area controllers 53 to 55. When the location of the content is checked, the service stream controller 52 may set an optimum path by taking a traffic state into account, and configure the service stream forwarding graph 62 based on the set path. In this case, the service stream controller 52 may generate and assign the adaptive service content forwarder 63 as an instance to every content request, and each instance may forward target content by setting the optimum path according to a traffic state of when the assigned service content request is made with reference to the generated service stream forwarding graph 62.

Here, the adaptive service content forwarder 63 may be provided in the form of an instance generated as software so as to be mapped according to services and at the same time individually processed whenever the service stream controller 52 for requesting content.

Here, the service stream controller 52 may forward the target content through the instance of the adaptive service content forwarder 63 mapped and assigned to the corresponding service with reference to the service stream forwarding graph 62 generated on the basis of the set path.

For example, when a request for content of a specific service is made, the adaptive service content forwarder 63 is assigned to each service traffic so as to transmit service traffics to an optimum communication path in accordance with a network state and enhance service quality, thereby determining a traffic state on a service traffic path and controlling an optimum path and service quality. In this case, the adaptive service content forwarder 63 may control a service providing path through which content cached according to the service stream forwarding graph 62 or content of a final service providing server can be transmitted on the basis of a domain ID (Area-ID), a content ID (Content-ID), and a TOS field as well as a match field of a packet.

Here, the service stream forwarding graph 62 may include information used in transmitting a content request to a node in which the target content is cached, based on multi-protocol label switching (MPLS). In accordance with a service content caching state and a network state between the service requesting node and the service providing server, the service stream forwarding graph may be configured to use a node (Intra-Area Cache) cached inside a domain where the service requesting node is located, a node (Inter-Area Cache) cached outside the domain of the service requesting node, or a host providing content.

Specifically, with regard to a path from the service requesting node (User Host) to the node (Intra-Area Cache) cached inside the domain of the service requesting node, the node (Inter-Area Cache) cached outside the domain of the service requesting node, or the host (Service Provider) providing the content, labeling is pushed to the content request packet, and the content request is transmitted while popping the label of the content request packet via the nodes on the path.

The same path may be used even when the content is transmitted from the cached node (Intra-Area Cache, Inter-Area Cache) or the host (Service Provider) of providing the content to the service requesting node (User Host). However, when the content is transmitted, the optimum path may be reset by taking a traffic state again into account.

Figure 7:
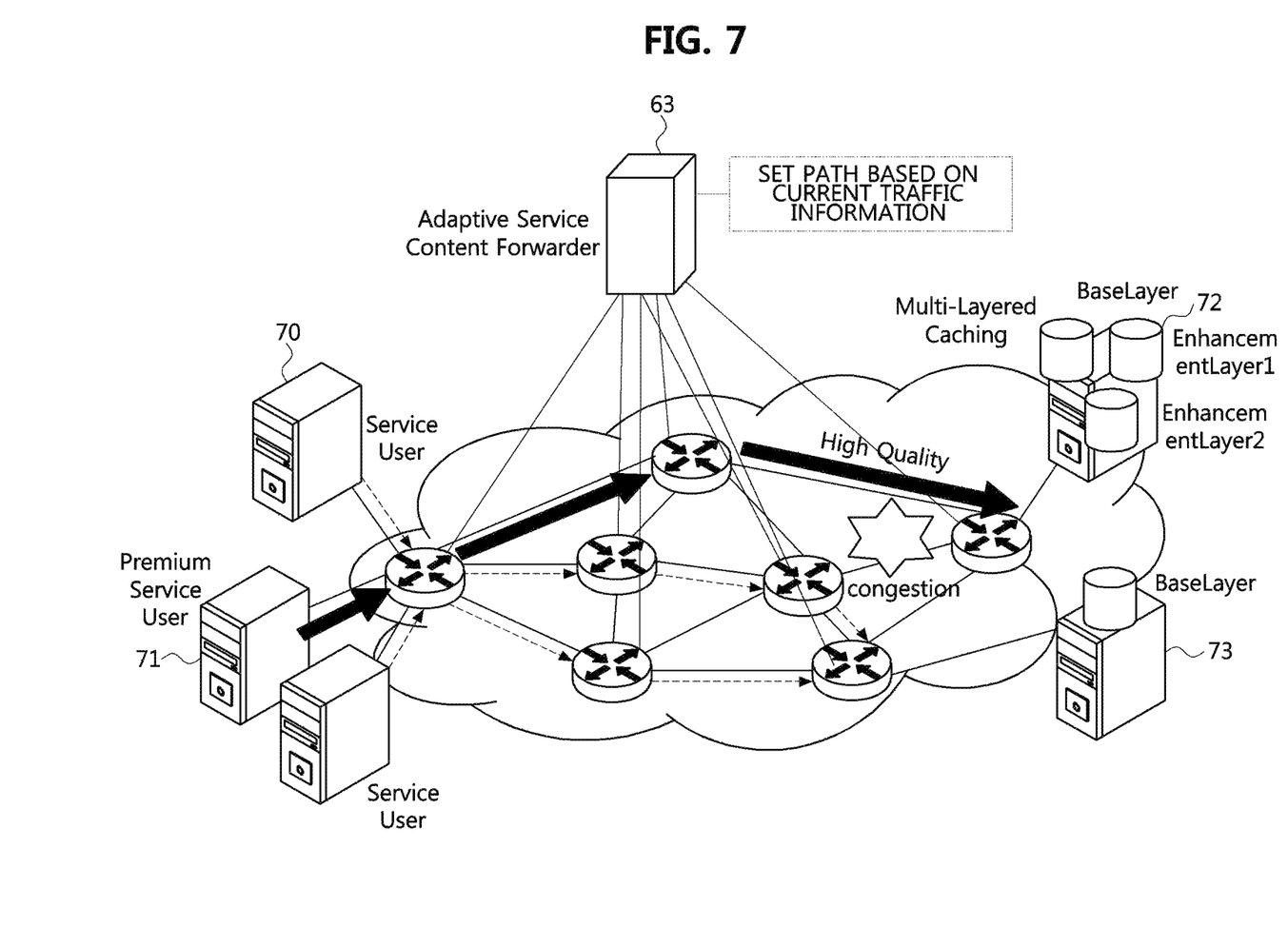
FIG. 7 is a diagram for describing an example of content having a multi-layered structure in the service stream control system.

FIG. 7 is a diagram for describing an example of content having a multi-layered structure in the service stream control system.

Referring to FIG. 7, target content to be stored in a host server of providing content or cached in a node on a network may be stored in a multi-layered structure including a base layer and an enhanced layer.

For example, users who request content may be different in service type from one another. The users may include a general user (Service User) and a premium user (Premium Service User), and the host server may include a premium server 72 storing both the base layer and the enhanced layer, and a general server 73 storing only the base layer. Further, the node on the network may cache only the base layer or cache both the base layer and the enhanced layer, or many nodes may partially cache the base layer and the enhanced layer with regard to one piece of content.

Here, the enhanced layer may be divided in units of segment having a reproducible length.

In this case, the service stream controller may forward only the base layer of the target content from the general server 73 in accordance with the TOS checked in the contest request, and may forward both the base layer and the enhanced layer of the target content from the premium server 72.

By providing both the base layer and the enhanced layer to a user, it is possible to provide content of high quality. However, when network congestion is high on a path to the premium server 72 storing both the base layer and the enhanced layer, the service stream controller 52 sets an optimum path by taking a traffic state into account as described with reference to FIG. 6, thereby avoiding the path of high congestion and providing a high-quality service.

Further, when the path is set by avoiding the traffic congestion, the service stream controller 52 may forward only the base layer of the target content or forward both the base layer and the enhanced layer of the target content through the instance of the adaptive service content forwarder 63 for the corresponding service stream, while taking the traffic state into account.

Here, forwarding both the base layer and the enhanced layer has to be construed as forwarding the base layer and the enhanced layer through different paths as well as the same network path.

As described above, the service stream control system may select a content caching location by the area controller, select an optimum path according to a network state and user priority to service types by the instance of the adaptive service content forwarder 63 for the corresponding service stream, and adjust quality of a cached service.

Figure 8:
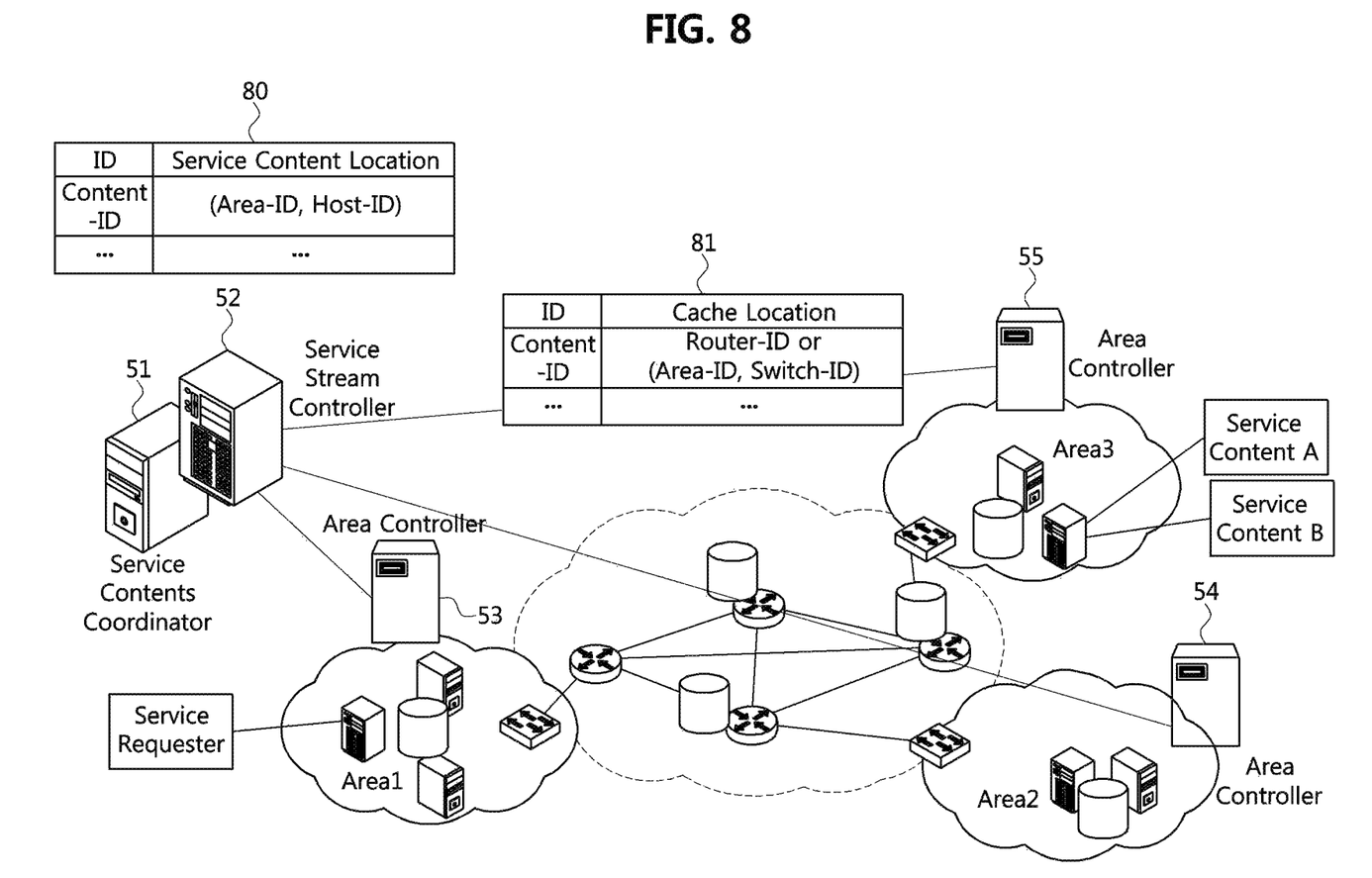
FIG. 8 is a second diagram for describing an example of a content forwarding process in the service stream control system.

FIG. 8 is a second diagram for describing an example of a content forwarding process in the service stream control system.

Referring to FIG. 8, it will be described in detail that a path is set on the basis of whether target content is cached within the first domain (Area1), and content is forwarded to a service requesting node.

In inter-area service communication of the service stream control system, a service stream forwarding graph is configured in order of a service requesting node, an intra-area cache, an inter-area cache, and a content providing host in accordance with corresponding service content caching conditions, and a content caching state and a traffic state are taken into account to forward a corresponding service stream on an optimum transmission path through an adaptive service content forwarder instance of the corresponding service stream based on the configured forwarding graph.

First, when the target content is cached in the first domain (Area1), the service stream controller 52 may control the adaptive service content forwarder instance interworking with the first area controller 53, and forward the target content along an intra-cache path set between nodes within the first domain (Area1).

Specifically, the service stream controller 52 may check the host server (Host-ID) or domain (Area-ID), in which the content is stored, from the information managed by the service content coordinator 51 as shown in FIGS. 5 and 6.

For example, a cached domain name (Area-ID) or a cached node (Router-ID, Switch-ID) cached in a third domain (Area 3) from information 81 managed by the third area controller 55 may be checked while interworking with the third area controller 55.

As a result of checking the location of the content, when the service requesting node for requesting content is in the first domain (Area1) and the requested target content is cached in the node within the first domain (Area1), it is possible to quickly provide the target content by setting an intra-path within the first domain (Area1) since the service requesting node and the node capable of providing the target content are located within the same first domain (Area1).

On the other hand, when the target content is not cached within the first domain (Area1), the service stream controller 52 may forward the target content by setting an inter-cache path through a gateway node connected to the domain in which the target content is cached.

For example, when the target content is cached in the third domain (Area 3), the target content is forwarded by setting a path from the service requesting node to the gateway node of the third domain.

Figure 9:
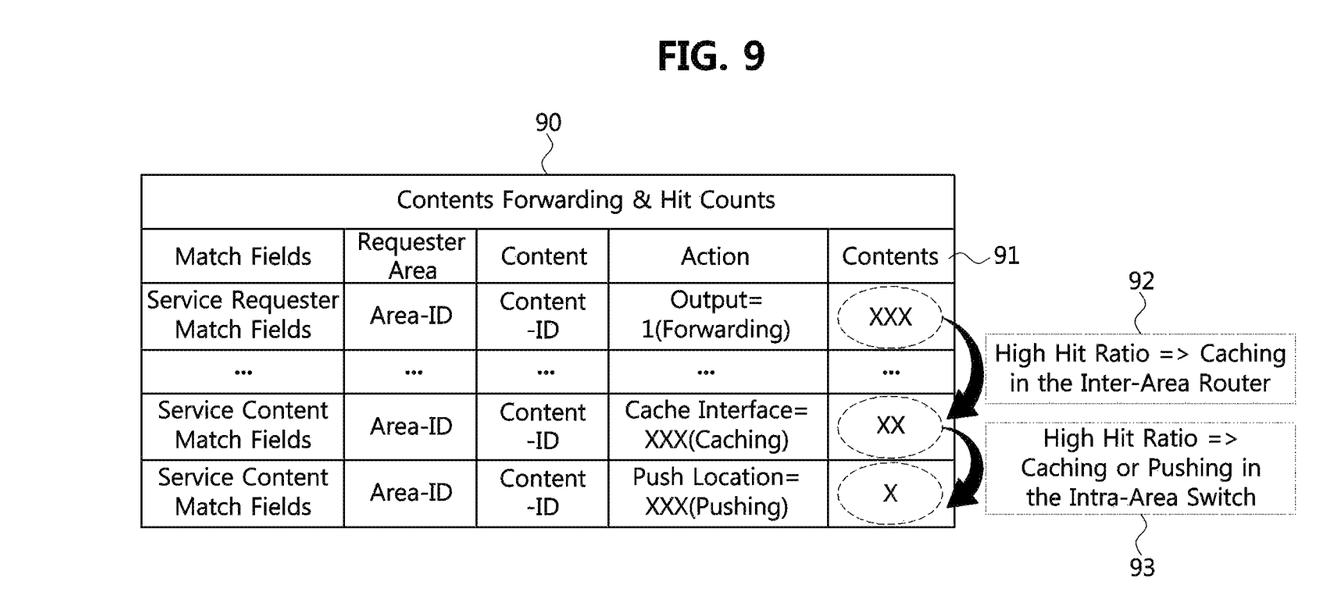
FIG. 9 is a diagram of an example of a content forwarding table in the service stream control system.

FIG. 9 is a diagram of an example of a content forwarding table in the service stream control system.

Referring to FIG. 9, an additional operation on content forwarding will be described on the basis of the content forwarding table in which content forwarding states are reflected and managed.

First, when the service stream controller receives a content request, the service stream controller may forward content while interworking with an area controller through the adaptive service content forwarder instance for transmitting a service stream in response to the content request, and establish a content forwarding table for managing a forwarding state.

Specifically, the content forwarding table is tabulated to record match fields for identifying a specific service requesting node (Service Requester) for requesting content; domain names (Request Area) of the service requesting nodes; forwarded content (Content); and forwarding actions notifying of forwarding port information as a transmission path, and may store the number of forwarding times (Counts).

When the number of times to forward target content is equal to or higher than a threshold value, the service stream controller recognizes the target content as popular content, and adds an entry to the content forwarding table in order to perform a caching action along with caching interface information about the corresponding content so that the target content can be additionally cached in a node (Inter-Area Cache, e.g., a router) cached outside the domain of the service requesting node, i.e., in the proximity of the domain of the service requesting node on the network path through which the corresponding content is provided, in order to avoid the corresponding path from being overloaded.

After the foregoing process, when the number of times to forward the content cached in the node (Inter-Area Router) outside the domain of the service requesting node is also equal to or higher than a threshold value, a caching action for the corresponding content may be added as an entry to the content forwarding table so that the target content may be additionally cached in a node (Intra-Area Switch) within the domain of the service requesting node in order to transmit the corresponding content in real time.

Further, when the node (Intra-Area Switch) caching content within the domain of the service requesting node is overloaded, the content cached in the multi-layered structure may be distributed to and cached in the nodes (Intra-Area Switch) within the domains of neighboring service requesting nodes in such a manner of partially caching content corresponding to only the base layer or content of high quality configured with both the base layer and the enhanced layer so as to minimize transmission traffic.

To distribute and cache the content in the nodes (Inter-Area Switch) within the neighboring domain, the content forwarding table may be updated to perform a pushing action for designating a caching interface along with content layer information.

In the distributed forwarding system for the service stream according to the present invention, a caching action for requesting caching popular content in a router or switch cache on a service content path, and a pushing action of distributing and caching the corresponding content in neighboring caches when a content cache is overloaded may be provided in addition to a forwarding action of forwarding the content to a specific port by extension of the OpenFlow protocol.

In particular, as described above with reference to FIG. 8, forwarding on the inter-cache path generally needs more hops than that on the intra-cache path, and thus additional caching may be required as a high load is applied to the network.

Therefore, the service stream controller may control a first node located on the inter-cache path to cache the target content (Caching in the Inter-Area Router, 92) when the number of times to forward the target content on the inter-cache path is equal to or higher than a threshold value. In this case, the threshold value may be dynamically determined in accordance with a policy or a traffic state, or may be previously set by a system manager.

Here, the service stream controller may select a node, which is close to the service requesting node, among the nodes on the inter-cache path, and preferentially cache the target content in the selected node. Alternatively, the service stream controller may select a different node in accordance with a traffic state.

Meanwhile, when the cached target content is forwarded many times from a certain node, this node may be overloaded.

Therefore, the service stream controller may control a second node within the domain, to which the first node belongs, to cache the target content when the first node forwards the target content many times.

Figure 10:
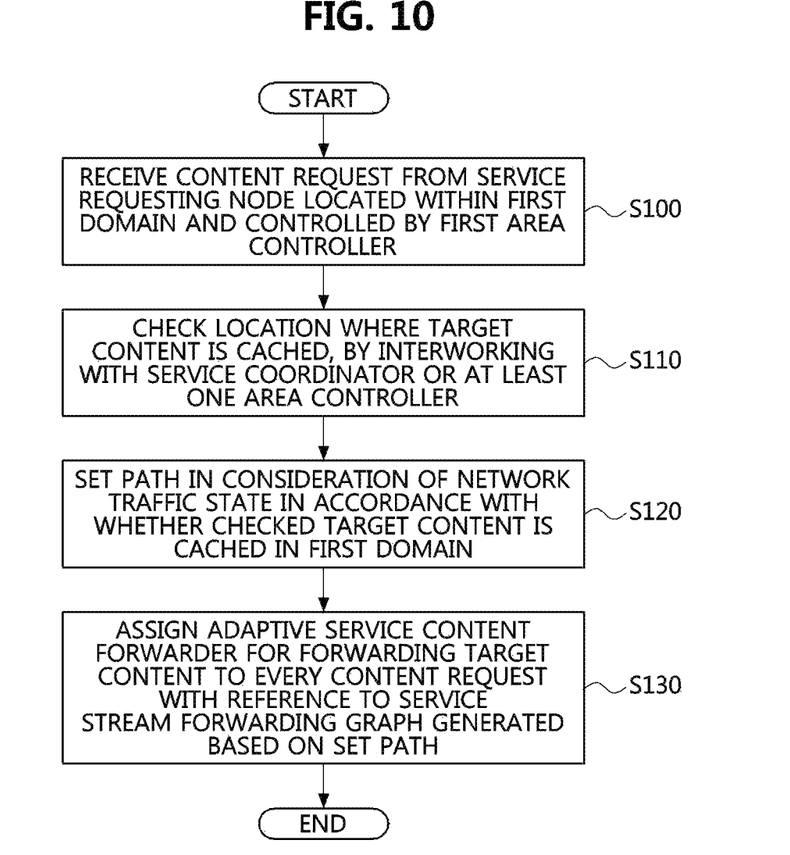
FIG. 10 is a flowchart of a service stream control method.

FIG. 10 is a flowchart of a service stream control method.

Referring to FIG. 10, the service stream control method of a service stream controller interworking at least one area controller and a service content coordinator may include an operation S100 of receiving a content request from a service requesting node located within a first domain controlled by a first area controller; an operation S110 of checking a location at which target content corresponding to the content request is cached, by interworking with the service content coordinator or the at least one area controller; an operation S120 of setting a path in accordance with a network traffic state based on whether the checked target content is cached in the first domain, and an operation S130 of assigning an adaptive service content forwarder for forwarding the target content to every content request with reference to a service stream forwarding graph generated based on the set path.

In other words, the service stream controller may check a location where the target content corresponding to the content request received from the first area controller is cached, by interworking with the service content coordinator or the at least one area controller.

Here, the operation S120 of setting a path in accordance with a network traffic state may include setting the path by taking the network traffic state into account in accordance with whether the checked target content is in an Intra-Area Caching state of being cached in the first domain where the service requesting node is present, or in an Inter-Area Caching state of being cached between a domain where the service requesting node is present and a domain where a target content server is present.

Here, the adaptive service content forwarder adaptively controls the quality of the target content in accordance with the network traffic states and the service corresponding to the content request, thereby forwarding the target content.

Here, the service stream forwarding graph may include information about transmission of the content request to a node in which the target content is cached, based on MPLS.

Here, the target content may be cached in a multi-layered structure including a base layer and an enhanced layer.

Here, the adaptive service content forwarder may forward the target content along the intra-cache path set between the nodes within the first domain by interworking with the first area controller when the target content is cached in the first domain, and may forward the target content along the inter-cache path set using the gateway node connected to the domain, in which the target content is cached, when the target content is not cached in the first domain.

Here, when the number of times to forward the target content is equal to or higher than a threshold value, there may be further included an operation of controlling the target content to be additionally cached in a first node that belongs to a domain adjacent to the first domain.

Here, when the number of times to forward the target content from the first node is equal to or higher than a threshold value, there may be further included an operation of controlling the target content to be additionally cached in a second node within the first domain.

Here, when a request for the target content additionally cached in the second node is made equal to or more than a preset value, the base layer of the target content or both the base layer and the enhanced layer of the target content may be controlled to be partially cached in different nodes located within the first domain.

Besides, the CCN-based service stream control method according to one embodiment of the present invention may perform operations or functions of the service stream controller described with reference to FIGS. 1 to 9.

Figure 11:
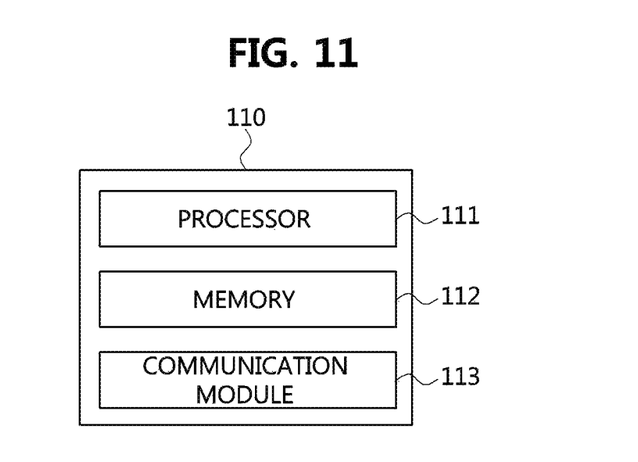
FIG. 11 is a block diagram of a service stream control apparatus.

FIG. 11 is a block diagram of a service stream control apparatus.

Referring to FIG. 11, a service stream control apparatus 110 may include a processor 111 for executing at least one command and a memory 112 for storing the at least one command.

Here, the service stream control apparatus 110 may refer to the service stream controller described with reference to FIG. 5.

Here, the service stream control apparatus 110 may further include a communication module 113 for communicating with the area controllers of FIG. 5, or communicating with a service content coordinator through a wired/wireless network.

Here, the processor 111 receives a content request from a service requesting node located within a first domain and controlled by a first area controller; checks a location where target content corresponding to the content request is cached, by interworking with the service content coordinator or at least one area controller; sets a path in accordance with a traffic state by interworking with the at least one area controller and the service content coordinator, based on whether the checked target content is cached within the first domain; and assigns an adaptive service content forwarder for forwarding the target content to every content request with reference to a service stream forwarding graph generated based on the set path, thereby forwarding the target content.

Besides, the service stream control apparatus 110 may include the elements of the service stream controller described with reference to FIGS. 5 to 10, and detailed descriptions thereof will be omitted to avoid repetitive descriptions.

As described above, the service stream control system, method or apparatus according to the present invention sets an optimum path based on a multiplexed controller structure, thereby solving problems of traffic congestion and the like and being easily applicable to a large-scale network.

Further, popular content is gradually cached in a node on a path, via which the packet is transmitted, instead of caching data in all the nodes, and the content is stored in a multi-layered structure, thereby enhancing efficiency while taking a traffic state into account.

While the example embodiments of the present invention and their advantages have been described in detail, it should be understood that various changes, substitutions and alterations may be made herein without departing from the scope of the invention.

What is claimed is:

1. A service stream control system comprising:
a plurality of area controllers configured to control traffic paths and content caching within a plurality of domains under control of the plurality of area controllers;
a service content coordinator configured to determine and manage a caching location of content located in each of the domains; and
a service stream controller configured to set an optimum path in accordance with a network traffic state through interworking with the area controllers and the service content coordinator, and to forward target content corresponding to a content request with reference to a service stream forwarding graph generated based on the set path,
wherein, when the service stream controller receives a content request from a service requesting node located within a first one of the domains under control of a first one of the area controllers, the service stream controller is configured to:
check where the target content is cached, through interworking with the service content coordinator or the area controllers;
set a path in accordance with a network traffic state, based on whether the checked target content is cached in the first domain; and
assign an adaptive service content forwarder for forwarding the target content with reference to the service stream forwarding graph generated based on the set path when each content request is received, and
wherein the service stream forwarding graph comprises information used in transmitting the content request to a node in which the target content is cached, based on multi-protocol label switching (MPLS).

2. The service stream control system of claim 1, wherein the adaptive service content forwarder forwards the target content by adaptively controlling quality of the target content in accordance with the network traffic state and a service corresponding to the content request.

3. The service stream control system of claim 2, wherein the target content is cached in a multi-layered structure including a base layer and an enhanced layer.

4. The service stream control system of claim 3, wherein the adaptive service content forwarder forwards only the base layer of the target content or forwards the enhanced layer of the target content together with the base layer of the target content, by taking the network traffic state into account.

5. The service stream control system of claim 3, wherein the adaptive service content forwarder forwards only the base layer of the target content or forwards the enhanced layer of the target content together with the base layer of the target content, in accordance with a type of service (TOS) checked in the content request.

6. The service stream control system of claim 2, wherein the adaptive service content forwarder is configured to:
forward the target content along an intra-cache path set between nodes within the first domain through interworking with the first area controller, when the target content is cached in the first domain; and
forward the target content along an inter-cache path set through a gateway node connected to a domain in which the target content is cached, when the target content is not cached in the first domain.

7. The service stream control system of claim 3, wherein the service stream controller is configured to additionally cache the target content in a first node that belongs to a domain adjacent to the first domain, when the target content is forwarded by the number of times equal to or higher than a threshold value.

8. The service stream control system of claim 7, wherein the service stream controller is configured to additionally cache the target content in a second node within the first domain, when the target content is forwarded from the first node by the number of times equal to or higher than a threshold value.

9. The service stream control system of claim 8, wherein the service stream controller is configured to distributedly cache the base layer of the target content or both the base layer and the enhanced layer of the target content in different nodes located within the first domain, when a request for the target content additionally cached in the second node is made by the number of times equal to or more than a preset value.

10. A service stream control method in a service stream controller interworking with a plurality of area controllers and a service content coordinator, the plurality of area controllers being configured to control traffic paths and content caching within a plurality of domains under control of the plurality of area controllers, the service stream control method comprising:
receiving a content request from a service requesting node located within a first one of the domains under control of a first one of the area controllers;
checking where target content corresponding to the content request is cached, through interworking with the service content coordinator or the area controllers;
setting a path in accordance with a network traffic state, based on whether the checked target content is cached in the first domain; and
assigning an adaptive service content forwarder for forwarding the target content with reference to a service stream forwarding graph generated based on the set path when each content request is received,
wherein the service stream forwarding graph comprises information used in transmitting the content request to a node in which the target content is cached, based on multi-protocol label switching (MPLS).

11. The service stream control method of claim 10, wherein the adaptive service content forwarder forwards the target content by adaptively controlling quality of the target content in accordance with the network traffic state and a service corresponding to the content request.

12. The service stream control method of claim 11, wherein the target content is cached in a multi-layered structure including a base layer and an enhanced layer.

13. The service stream control method of claim 11, wherein the adaptive service content forwarder is configured to:
forward the target content along an intra-cache path set between nodes within the first domain through interworking with the first area controller, when the target content is cached in the first domain; and
forward the target content along an inter-cache path set through a gateway node connected to a domain in which the target content is cached, when the target content is not cached in the first domain.

14. The service stream control method of claim 12, further comprising additionally caching the target content in a first node that belongs to a domain adjacent to the first domain, when the target content is forwarded by the number of times equal to or higher than a threshold value.

15. The service stream control method of claim 14, further comprising additionally caching the target content in a second node within the first domain, when the target content is forwarded from the first node by the number of times equal to or higher than a threshold value.

16. The service stream control method of claim 15, further comprising distributedly caching the base layer of the target content or both the base layer and the enhanced layer of the target content in different nodes located within the first domain, when a request for the target content additionally cached in the second node is made by the number of times equal to or more than a preset value.

17. A service stream control apparatus comprising:
a processor configured to execute at least one command; and
a memory configured to store the at least one command, wherein the processor is configured to:
receive a content request from a service requesting node located within a first one of domains under control of a first one of area controllers,
check where target content corresponding to the content request is cached, through interworking with a service content coordinator or the area controllers,
set a path in accordance with a network traffic state, based on whether the checked target content is cached in the first domain, and
assign an adaptive service content forwarder for forwarding the target content with reference to a service stream forwarding graph generated based on the set path when each content request is received, and
wherein the service stream forwarding graph comprises information used in transmitting the content request to a node in which the target content is cached, based on multi-protocol label switching (MPLS).

* * * * *